3,824,275
Patented July 16, 1974

3,824,275
DIRECT MONO-ESTERIFICATION OF ARYLMALONIC ACIDS
Robert V. Kasubick, Gales Ferry, Conn., assignor to Pfizer Inc., New York, N.Y.
No Drawing. Continuation of abandoned application Ser. No. 793,530, Jan. 23, 1969. This application July 27, 1971, Ser. No. 166,560
Int. Cl. C07c 69/76
U.S. Cl. 260—475 SC                    1 Claim

ABSTRACT OF THE DISCLOSURE

The direct mono-esterification of aryl malonic acids in the presence of thionyl chloride or thionyl bromide and an N,N-di(lower)-alkylformamide or N,N-di(lower)alkylacetamide in an ether solvent is described.

This application is a continuation of Ser. No. 793,530, Jan. 23, 1969, now abandoned.

BACKGROUND OF THE INVENTION

This invention relates to a novel and improved process for the preparation of mono-esters of dicarboxylic acids. More particularly, it relates to a one-step process for the mono-esterification of aryl malonic acids by conducting the esterification in the presence of thionyl chloride or thionyl bromide (referred to hereinafter as thionyl halides), and a catalytic amount of N,N-di(lower)alkylformamide or N,N-di(lower)-alkylacetamide in an ether solvent.

The formation of mono-esters of aryl malonic acids, and of dicarboxylic acids in general, requires at best a two-step process. In the case of those dibasic acids which readily form cyclic anhydrides, mono-esterification is accomplished by reaction of the anhydride with the appropriate alcohol. In the case of those dibasic acids which are not capable of forming cyclic anhydrides, mono-esterification is generally accomplished by careful hydrolysis, e.g. saponification, of the appropriate diester. For such acids, a three-step process is required. Such multistep processes, in addition to being time-consuming, are frequently economically unattractive in those instances wherein the dibasic acid serves as basis for the calculations.

The use of thionyl cholride as catalyst for the esterification of a variety of amino acids such as phthaloylglycine and tosylglycine, and of peptides, such as phthaloylglycyl-DL-valine, is described by Taschner et al., Ann. 640, 136–9 (1961) [C.A., 55, 14318e]. The direct mono-esterification of aryl malonic acids using phosphorous oxychloride or phosphorous oxybromide as catalyst is described by Nakanishi, U.S. Ser. No. 761,320, filed Sept. 20, 1968.

SUMMARY OF THE INVENTION

It has now been found that aryl malonic acids can be directly monoesterified in a one-step process by conducting the esterification in the presence of a thionyl halide and an N,N-di(lower)alkyl alkanoic acid amide in an ether solvent. It is indeed surprising and unexpected that mono-esterification of such acids can be made to proceed as the predominant reaction with production of satisfactory yields of the desired mono-esters. It is especially surprising that the process proceeds so well in the case of aryl malonic acids, such as phenylmalonic acid and substituted phenylmalonic acids, in view of the acidity of such acids.

The process, in general, comprises reacting the aryl malonic acid, the appropriate alcohol, and thionyl halide in a molar ratio of from about 2:1:1 to about 1:1.2:1 and at a temperature of from about 20° C. to about 110° C. in a reaction-inert solvent in the presence of an N,N-di(lower)alkyl alkanoic acid amide. A reaction-inert solvent, that is, one which does not react with the reactants or products, is desirably used since it affords better control of the reaction. The reaction period, of course, depends upon the nature of the reactants and the temperature. Higher temperatures, as expected, require shorter reaction periods than do lower temperatures for a given set of reactants. In general, reaction periods of from about one hour to about eight hours are adequate.

The process is economically valuable for the mono-esterification of aryl malonic acids; e.g. phenyl and substituted phenyl wherein the substituent is selected from the group consisting of (lower)alkyl, chloro, bromo, (lower)alkoxy, di(lower)alkylamino and trifluoromethyl; thienyl-, pyridyl and furyl malonic acids. The moon-esters thus produced are of value as intermediates for the production of the corresponding mono-ester acid chlorides which serve as agents for the production of antibacterial penicillins by the acylation of 6-aminopenicillanic acid as described in British 1,004,670.

DETAILED DESCRIPTION OF THE INVENTION

The novel mono-esterification process of the present invention is desirably conducted in such a manner as to avoid the presence of large excesses of aryl malonic acid or of alcohol in the presence of the thionyl halide. This is conveniently accomplished by mixing the aryl malonic acid and alcohol together at the beginning of the reaction prior to bringing them into contact with the thionyl halide. Other methods of accomplishing this will be obvious to those skilled in the art. One such method comprises the simultaneous addition of the aryl malonic acid and alcohol in substantially equimolar proportions to the thionyl halied. The continuous or dropwise addition of any of the reactants appears to offer no advantages.

The use of a large excess of acid, e.g. greater than two moles of acid/mole of alcohol, appears to offer no advantage in most instances. In fact, it generally results in reduced yields relative to those obtained with approximately equimolar ratios of dibasic acid and alcohol. In order to obtain satisfactory yields of the mono-esters, a molar ratio of aryl malonic acid to alcohol of from about 2.0:1.0 to about 1.0:1.2 is favored.

The molar proportion of thionyl halide can vary within relatively wide limits. For convenience, the molar proportion of thionyl halide is based upon the amount of dibasic acid used. Satisfactory yields are obtained using molar ratios of dibasic acid:thionyl halide of from about 2.0:1.0 to about 1.0 to 1.0. Higher or lower proportions can, of course, be used. The yields of mono-ester products are, however, lowered by operating outside these proportions.

The term "alcohol," as used herein, is intended to include the aliphatic alcohols, substituted aliphatic alcohols, phenol and substituted phenols, naphthols and substituted naphthols wherein the substituent is alkyl, halogen, dialkylamino, nitro, alkoxy, alkanoyl, or other substituent which does not react with thionyl halides; alicyclic alcohols, indanols and hydrogenated derivatives of phenols and naphthols, such as the tetrahydronaphthols. The process is applicable to all saturated and aromatic hydrocarbon alcohols, that is, to all hydrocarbons bearing a hydroxy substituent.

Representative of such alcohols are methyl, ethyl, butyl, hexyl, octyl, dodecyl, cyclohexyl, cyclopropyl, benzohydryl, 2 - chloroethyl, 3 - nitropropyl, 2 - dimethylaminoethyl alcohols, phenol, p-nitrophenol, p-dimethylaminophenyl, o-chlorophenol, o-isopropylphenol, 4-methoxyphenol, 2,4-dimethylphenol, 3,4-dimethylphenol, 2-chloro-4-methylphenol, 4-indanol, 5-indanol, 2-naphthol, 2-(1,2,3,4-tetrahydronaphthol), cholesterol, and others exemplified herein.

The preferred molar ratios of dibasic acid:alcohol:thionyl halide are from about 1.5:1.0:1.0 to about 1.0:1.2:1.0. Satisfactory yields, however, are obtained when operating with molar ratios of from about 2.0:1.0:1 to about 1:1.2:1.0. Molar proportions of reactants, especially of alcohol and thionyl halide greater than the upper limit given above, favor di-esterification.

The reaction is conducted in a reaction-inert, ether type solvent. Suitable solvents are ethers such as diethyl ether, di-isopropyl ether, ethyl propyl ether, di-n-propyl ether, tetrahydrofuran, dioxane, 1,2-dimethoxyethane, the dimethyl and diethyl ethers of diethylene glycol. The principal criteria for the ethers are that they serve as solvents for reactants and products and contain no functional groups, e.g. hydroxy, capable of reacting with the thionyl halides.

The presence of a small amount of an N,N-di(lower) alkyl alkanoic acid amide is necessary for the attainment of optimum yields. The amount of amide used varies, in general, from about 2 to about 12 mole percent and preferably from about 7 to about 12 mole percent based upon the aryl malonic acid used. This amount of amide is, relatively speaking, sufficiently small as to be considered a "catalytic" amount for the purpose of this process. The of less than 2 mole percent results in a slower rate of reaction. Amounts greater than about 12 mole percent produce increased amounts of impurities.

A great variety of N,N-di(lower)alkyl alkanoic acid amides are operative in this process. Suitable amides are those of alkanoic acids containing from one to eighteen carbon atoms and wherein the lower alkyl substituent contain from one to four carbon atoms. Representative of these are amides having the formula

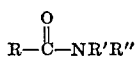

wherein R is selected from the group consisting of hydrogen and alkyl of from one to seventeen carbon atoms; R' and R" are lower alkyl, that is, an alkyl group having from one to four carbon atoms.

The preferred amides for this process are N,N-dimethyl formamide and N,N-dimethylacetamide because of their availability and solubility in the above-mentioned ether solvents. Other amides can, of course, be used, e.g. N,N-disubstituted amides of aromatic acids, such as N,N-dimethylbenzamide, N,N-dimethylphenylacetamide, but appear to offer no advantages over the preferred amides. The principal criteria regarding choice of the amide are solubility in the ether solvent and the absence of reactive functional groups, of course, than the amide group itself, e.g. hydroxyl, carbonyl, in its structure. The formation of an adduct between the amide and thionyl halide may enter into the reaction mechanism.

The reaction is conducted at a temperature of from about 20° C. to about 110° C. The preferred range is from about 70° C. to 100° C. The reaction period is, of course, dependent upon the reactants and the temperature, as noted above, but in general ranges from about one hour to about eight hours.

Nitrogen or other reaction-inert gas is generally passed over or through the reaction mixture to facilitate removal of by-product hydrogen chloride or hydrogen bromide.

The following examples are provided to further illustrate the process of the present invention. They are, however, not to be construed as limiting the invention in any way.

EXAMPLE I

Mono-2-Isopropylphenyl Phenylmalonate (A) Phenylmalonic acid (16.2 g., 0.09 mole), 2-isopropylphenol (12.2 g., 0.09 mole), N,N-dimethylformamide (0.15 ml.) and diisopropyl ether (180 ml., dried over Linde molecular sieve, Type 3A, distributed by the Linde Company) are charged into a 250 ml. 3-neck, round bottom flask fitted with a stirrer, nitrogen inlet, reflux condenser and dropping funnel. Thionyl chloride (10.8 g., 0.09 mole) is added dropwise over a five-minute period. The mixture is continuously stirred and a stream of nitrogen passed over the mixture. The temperature remains below 25° C. during the addition. The mixture is heated to reflux for one hour then cooled to room temperature and extracted first with water (1× 60 ml.), then with a saturated aqueous solution of sodium bicarbonate (4× 70 ml.). The combined extracts are acidified to pH 2 with 6N hydrochloric acid then extracted with methylene chloride (4× 100 ml.). The methylene chloride extracts are dried over anhydrous sodium sulfate then concentrated under reduced pressure to an oil (21 g.). Hexane (25 ml.) is added to the oil, the solution seeded and chilled. The product is recovered by filtration, washed with cold hexane and dried. Yield=18.0 g. (67.0%), m.p. 70–74° C.

(B) Substitution of thionyl bromide for thionyl chloride produces substantially the same results.

(C) Substitution of N,N-dimethylformamide by N,N-diethyl- or N,N-di-n-butylformamide, or by N,N-di-n-propylacetamide produces substantially the same results.

EXAMPLE II

The procedure of Example I(A) is repeated but using the following quantities of reactants.

| PMA a | | IPP b | | SOCl₂ | | DMF c | | Yield | |
|---|---|---|---|---|---|---|---|---|---|
| G. | Mole | G. | Mole | G. | Mole | Ml. | Mole percent | G. | Percent |
| 16.2 | 0.09 | 12.2 | 0.09 | 10.8 | 0.09 | 0.75 | 11.5 | 16.3 | 60.7 |
| 16.2 | 0.09 | 12.2 | 0.09 | 10.8 | 0.09 | | | 3.6 | 13.4 |
| 5.4 | 0.03 | 4.1 | 0.03 | 5.96 | 0.05 | | | 2.8 | 31.6 |
| 5.4 | 0.03 | 4.1 | 0.03 | 5.96 | 0.05 | 0.05 | 2.3 | d 4.7 | |
| 5.4 | 0.03 | 4.1 | 0.03 | 5.96 | 0.05 | 0.15 | 6.9 | d 1.7 | |
| 5.4 | 0.03 | 4.1 | 0.03 | 3.6 | 0.03 | 0.15 | 6.9 | 6.0 | 67.7 |
| 16.2 | 0.09 | 12.2 | 0.09 | 10.8 | 0.09 | 0.75 | 11.4 | 18.1 | 78.0 |
| 16.2 | 0.09 | 12.2 | 0.09 | 10.8 | 0.09 | 0.75 | 11.4 | 10.9 | e 40.8 |
| 810 | 4.5 | 610 | 4.5 | 540 | 4.5 | 7.5 | 2.5 | 885 | 66.0 | a PMA=phenyl malonic acid.
b IPP=2-isopropylphenol.
c DMF=N,N-dimethylformamide.
d Yield of oil prior to crystallization.
e Refluxed for 15 minutes rather than one hour.

NOTE.—The volume of solvent used is increased or decreased in proportion to the moles of phenyl malonic acid used. The reaction mixtures are extracted with a saturated solution of dipotassium hydrogen phosphate in place of a sodium bicarbonate to avoid foaming.

EXAMPLE III

The procedure of Example I(A) is repeated but using the following molar proportions of reactants.

| PMA | IPP | SOCl₂ | DMF, mole percent |
|---|---|---|---|
| 2.0 | 1.0 | 1.0 | 7 |
| 2.0 | 1.0 | 1.0 | 12 |
| 1.5 | 1.0 | 1.0 | 10 |
| 1.0 | 1.2 | 1.0 | 7 |
| 1.5 | 1.2 | 1.0 | 12 |

In each case satisfactory yields of the mono-ester are obtained.

EXAMPLE IV

Mono-5-Indanylphenylmalonate

Phenylmalonic acid (0.09 mole), 5-indanol (0.09 mole), thionyl chloride (0.09 mole), N,N-dimethylformamide (0.15 ml.) and diisopropyl ether (180 ml.) are reacted according to the procedure of Example I. The oily product (16.0 g.) obtained from the extracts crystallizes upon standing and is purified by recrystallization from hexane; m.p. 107.5°–108° C. Yield=48.3%.

EXAMPLE V

The procedure of Example IV is repeated but with modifications noted below to produce satisfactory yields of the mono-5-indanyl ester.

| PMA, moles | 5.indanol, moles | SOCl$_2$, moles | Amide, mole percent | Ether solvent | T.,° C. | Time, hours |
|---|---|---|---|---|---|---|
| 0.09 | 0,09 | 0,09 | DMA [a] | Diisopropyl | Reflux | 1 |
| 0.09 | 0,09 | 0,09 | DMF | Diethyl | do | 1 |
| 0.18 | 0,09 | 0,09 | DMF | Dioxane | do | 1 |
| 0.14 | 0,09 | 0,09 | DMA | THF [b] | do | 2 |
| 0.09 | 0,11 | 0,09 | DMA | Di-n-propyl | do | 1,5 |
| 0.09 | 0,05 | 0,05 | DMF | DME [c] | do | 1 |
|  |  | 0,05 | DMF | Diglyme [d] | 110 | 1 |
| 0.05 | 0,05 | 0,05 | DMF | Diisopropyl | 20 | 8 |
| 0.05 | 0,05 | 0,05 | DMA | Ethylpropyl | Reflux | 4 |

[a] DMA=dimethylacetamide.
[b] THF=tetrahydrofuran.
[c] DME=1,2-dimethoxyethane.
[d] Diglyme=dimethylether of diethylene glycol.

EXAMPLE VI

The following esters of phenylmalonic acid are prepared by the procedure of Example I(A).

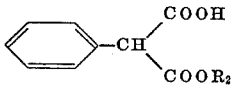

| R$_2$ | R$_2$ |
|---|---|
| Methyl. | Acetonyl. |
| Ethyl. | Acetonylmethyl. |
| n-Butyl. | 2-oxopentyl. |
| t-Butyl. | 5-oxohexyl. |
| Hexyl. | 1-methoxy-2,2,2-trichloroethyl. |
| Dodecyl. | 1-ethoxy-2,2,2-trichloroethyl. |
| Octadecyl. | 1-methoxy-2,2,2-trifluoroethyl. |
| 2-chloroethyl. | 1-butoxy-2,2,2-trifluoroethyl. |
| 3-chloropropyl. | 2-oxo-3-chloropropyl. |
| 4-chloro-1-butyl. | 2-chloro-2-nitro-3-methylbutyl. |
| 1-ethyl-2-chloroethyl. | 2-fluoroethyl. |
| 2-bromoethyl. | Cyclopropyl. |
| 1,3-dichloropropyl. | cyclohexyl. |
| 2-bromo-3-chloropropyl. | Cycloheptyl. |
| 1,4-dibromo-2-butyl. | 1-methyl-1-cyclopentyl. |
| 2,2,3-trichlorobutyl. | 1,3-dimethyl-1-cyclopentyl. |
| 2,2,3,3-tetrabromopropyl. | 3-methyl-1-cyclohexyl. |
| 2,2,2-trichloroethyl. | 3-methyl-1-indanyl. |
| 2,2,2-trifluoroethyl. | 3-ethyl-1-indanyl. |
| 2-nitroethyl. | 2,2-dimethyl-1-indanyl. |
| 3-nitropropyl. | 2-chloro-1-indanyl. |
| 4-nitrobutyl. | 4-chloro-1-indanyl. |
| 1-ethyl-2-nitroethyl. | 1-chloro-2-indanyl. |
| 2,2-dinitroethyl. | 9-fluorenyl. |
| 2-bromo-2-nitroethyl. | 2,4-dipropyl-1-cyclopentyl. |
| 2-chloro-2-nitropropyl. | 3-isobutyl-5-methyl-1-cyclohexyl. |
| 1-trichloromethyl-2-nitroethyl. | 2,2,3,6,6-pentamethyl-1-cyclohexyl. |
| 1-trifluoromethylpropyl. | 1-(2-methyl-1,2,3,4-tetrahydronaphthyl). |
| 2-methoxyethyl. | 1-(1,3-dimethyl-1,2,3,4-tetrahydronaphthyl). |
| 2-ethoxyethyl. | 1-(1,2,7-trimethyl-1,2,3,4-tetrahydronaphthyl). |
| 3-n-propoxypropyl. | 2-(1-methyl-1,2,3,4-tetrahydronaphthyl). |
| 4-butoxy-n-butyl. | 1-(2-chloro-1,2,3,4-tetrahydronaphthyl). |
| 1-cyanoethyl. | 2-(3-bromo-1,2,3,4-tetrahydronaphthyl). |
| 2-cyanoethyl. | Phenyl. |
| 4-cyanobutyl. | 2,3-dimethoxyphenyl. |
| 1-cyano-2,2-dichloropropyl. | 2,6-dimethoxyphenyl. |
| 1-cyano-2,2,2-trichloroethyl. | 3,4,5-trimethoxyphenyl. |
| 2-formyloxyethyl. | 4-indanyl. |
| 2-acetoxyethyl. | 1-indanyl. |
| 3-acetoxypropyl. | 1-methyl-4-indanyl. |
| o-Tolyl. | 3-methyl-4-indanyl. |
| m-Tolyl. | 1-methyl-5-indanyl. |
| p-Tolyl. | 7-methyl-5-indanyl. |
| o-Ethylphenyl. | 4,6-dimethyl-5-indanyl. |
| o-n-Propylphenyl. | 5-chloro-4-indanyl. |
| m-Isopropylphenyl. | 7-bromo-4-indanyl. |
| p-t-Butylphenyl. | 1,7-dimethyl-4-indanyl. |
| o-Methoxyphenyl. | 1,1,7-trimethyl-4-indanyl. |
| p-Methoxyphenyl. | 4-(1-indanyl)phenyl. |
| m-Ethoxyphenyl. | 4-(α,α-dimethylbenzyl)phenyl. |
| o-Chlorophenyl. | 1-naphthyl. |
| m-Bromophenyl. | 2-naphthyl. |
| p-Fluorophenyl. | 1-(5,6,7,8-tetrahydronaphthyl). |
| o-formylphenyl. | 2-(5,6,7,8-tetrahydronaphthyl). |
| p-Acetylphenyl. | 3-(2-methyl-4-pyronyl). |
| p-Butyrylphenyl. | 4-quinolyl. |
| o-Nitrophenyl. | 8-quinolyl. |
| p-Nitrophenyl. | 5-(1,4-naphthoquinonyl). |
| o-Dimethylaminophenyl. | 4-(coumarinyl). |
| o-Diethylaminophenyl. | 4-thianaphthenyl. |
| m-di-n-propylaminophenyl. | 1-phenazinyl. |
| p-Methylisopropylaminophenyl. | 2-phenazinyl. |
| 2,3-dimethylphenyl. | 2-(anthraquinonyl). |
| 2,4-dimethylphenyl. | 1-fluorenyl. |
| 2,5-dimethylphenyl. |  |
| 2,6-dimethylphenyl. |  |
| 3,4-dimethylphenyl. |  |
| 2-ethyl-4-methylphenyl. |  |
| 2,4,6-trimethylphenyl. |  |
| 2,6-dichlorophenyl. |  |

TABLE—Continued

| R$_2$ | R$_2$ |
|---|---|
| 2,4-dibromophenyl. | 6-(1,2-naphthoquinonyl). |
| 3,4,5-trichlorophenyl. | 1-anthraquinonyl. |
| 2,4,6-tribromophenyl. | 8-isoquinolyl. |
| Pentachlorophenyl. | 5-(1,3-benzodioxolyl). |
| Pentabromophenyl. | 3-(4-pyronyl). |
| 2,4-dinitrophenyl. | 1-(3-methyl-5,6,7,8-tetrahydronaphthyl). |
| 2,3,6-trinitrophenyl. | 1-(2,4,6-trimethyl-5-6,7,8-tetrahydronaphthyl). |
| Pentanitrophenyl. | 2-furyl. |
| 2,4-difluorophenyl. | 2-dimethylaminoethyl. |
| Pentafluorophenyl. | 2-dibutylaminoethyl. |
| 3-chloro-2-fluorophenyl. | 2-di(n-propyl)aminoethyl. |
| 2-methoxy-4-methylphenyl. | 3-diethylaminopropyl. |
| 2-acetyl-4-fluorophenyl. | 2-(2-imidazolino)ethyl. |
| 6-chloro-2-methylphenyl. | 2-piperidinoethyl. |
| 4-chloro-2-methylphenyl. | 2-pyrrolidinoethyl. |
| 2-chloro-2-methylphenyl. | 3-morpholinopropyl. |
| 2-fluoro-4-methylphenyl. | 3-thiomorpholinopropyl. |
| 4-chloro-2,3-dimethylphenyl. | 2-(2,5-dimethylpyrrolidino)ethyl. |
| 4-chloro-2-nitrophenyl. | Allyl. |
| 4-chloro-2,6-dinitrophenyl. | 3-buten-1-yl. |
| 2-(1,4,5,6-tetrahydropyrimidino)ethyl. | 1-hexen-3-yl. |
| Pyrrolidinomethyl. | 2-hepten-4-yl. |
| (2-imidazolino)methyl. | 2-octen-1-yl. |
| Piperidinomethyl. | Propargyl. |
| Morpholinomethyl. | 1-hexyn-3-yl. |
| Thiomorpholinomethyl. | Benzyl. |
| 3-di-(n-propyl)amino-2-propyl. | o-Chlorobenzyl. |
| 2-diethylamino-1-propyl. | p-Bromobenzyl. |
| 3-pyrrolidino-2-propyl. | m-Methylbenzyl. |
| 3-piperidino-2-propyl. | o-Nitrobenzyl. |
| 3-morpholino-2-propyl. | m-Nitrobenzyl. |
| 3-dimethylamino-2-propyl. | o-Methoxybenzyl. |
| 2-pyrrolidino-1-propyl. | p-Ethoxybenzyl. |
| 2-(methylethylamino)ethyl. | m-Acetylbenzyl. |
| 2-(methylethylamino)-1-propyl. | o-fluorobenzyl. |
| 3-imidazolo-2-propyl. | o-Dimethylaminobenzyl. |
| 2-(N-methylanilino)ethyl. | p-Dimethylaminobenzyl. |
| 3-(N-methylanilino)-2-propyl. | Benzohydryl. |
| 2-(N-n-propylanilino)-1-propyl. | Trityl. |
| 2-pyrroethyl. | Cholesteryl. |
| 2-imidazoloethyl. | 2-furylmethyl. |
| 2-morpholinoethyl. | 2-pyridylmethyl. |
| 2-azetidinoethyl. | [2,2-dimethyl-1,3-dioxolon-4-yl]methyl. |
| Azetidinomethyl. | (2-pyrrolidono)methyl. |
| 2-pyridylmethyl. | 1-indanylmethyl. |
| 4-imidazolymethyl. | 2-indanylmethyl. |
| Phthalimidomethyl. |  |

EXAMPLE VII

The following aryl malonic acid mono-esters were prepared by the procedure of Example I from the appropriate aryl malonic acids and alcohols.

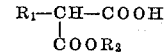

For each of the R$_2$ values listed, R$_1$=2-thienyl, 3-thienyl, 2-pyridyl, 2-furyl, and o-tolyl.

| R$_2$ | R$_2$ |
|---|---|
| Methyl. | 1-trichloromethyl-3-oxobutyl. |
| Ethyl. | 2-fluoroethyl. |
| t-Butyl. | Phenyl. |
| Hexyl. | o-Tolyl. |
| Octadecyl. | m-Tolyl. |
| 2-chloroethyl. | p-Tolyl. |
| 3-chloropropyl. | p-n-Propylphenyl. |
| 2-bromoethyl. | o-Isopropylphenyl. |
| 3-bromopropyl. | o-Methoxyphenyl. |
| 1-methyl-2-bromoethyl. | m-Ethoxyphenyl. |
| 1,3-dichloropropyl. | p-n-Butoxyphenyl. |
| 1,1-dichloromethylethyl. | o-Chlorophenyl. |
| 2,2,3-tribromopropyl. | p-Chlorophenyl. |
| 2,2,3,3-tetrabromopropyl. | m-Bromophenyl. |
| 2,2,2-trichloroethyl. | p-Fluorophenyl. |
| 2,2,2-trifluoroethyl. | o-Formylphenyl. |
| 2-nitroethyl. | p-Acetylphenyl. |
| 3-nitropropyl. | p-Butyrylphenyl. |
| 4-nitrobutyl. | o-Nitrophenyl. |
| 2,2-dinitroethyl. | m-Nitrophenyl. |
| 2-chloro-2-nitrobutyl. | o-Dimethylaminophenyl. |
| 1-trichloromethyl-2-nitroethyl. | m-Di-n-propylaminophenyl. |
| 1-trifluoromethylethyl. | p-Methylethylaminophenyl. |
| 2-methoxyethyl. | p-Methylisopropylaminophenyl. |
| 2-n-butoxyethyl. | 2,3-dimethylphenyl. |
| 2-cyanoethyl. | 2,6-dimethylphenyl. |
| 4-cyanobutyl. | 2,5-diethylphenyl. |
| 1-cyano-2-chloropropyl. | 2,6-dichlorophenyl. |
| 1-cyano-2,2,2-trichloroethyl. | 2,4-dibromophenyl. |
| 2-acetoxyethyl. | 2,3,4-trichlorophenyl. |
| 2-butyryloxyethyl. | Pentachlorophenyl. |
| Acetonly. | 3,5-dinitrophenyl. |
| 1-methyl-3-oxobutyl. | 2,3,6-trinitrophenyl. |
| 4-oxopentyl. | 2-methoxy-4-methylphenyl. |
| 2-acetylpropyl. | 5-bromo-2-methoxyphenyl. |
| 5-oxohexyl. | 2-chloro-6-methoxyphenyl. |
| 1-methoxy-2,2,2-trichloroethyl. | 2-methoxy-6-propylphenyl. |
| 1-butoxy-2,2,2-trichloroethyl. | 5-fluoro-2-methoxyphenyl. |
| 1-ethoxy-2,2,2-trifluoroethyl. | 2-acetyl-4-fluorophenyl. |
| 2-oxo-3-chloropropyl. | 6-chloro-2-methylphenyl. |

TABLE—Continued

| R₂ | R₂ |
|---|---|
| 4-chloro-2,3-dimethylphenyl. | 1,2,2-trimethyl-1-cyclopentyl. |
| 3-fluoro-4-nitrophenyl. | 1-ethyl-1-cyclohexyl. |
| 4-acetyl-2-fluoro-5-nitrophenyl. | 3-isopropyl-1-cylohexyl. |
| 5-(1,3-benzodioxolyl). | 1,2-dimethyl-1-cyclohexyl. |
| 2-acetyl-4-chlorophenyl. | 1,(1,2,3,4-tetrahydronaphthyl). |
| 2-acetyl-3,5-dichlorophenyl. | 3-methyl-l-indanyl. |
| 4-dimethylamino-2-methylphenyl. | 2,2-dimethyl-1-indanyl. |
| 2,6-dimethoxyphenyl. | 2-chloro-1-indanyl. |
| 3,4,5-trimethoxypenyl. | 3-bromo-1-indanyl. |
| 4-indanyl. | 9-fluorenyl. |
| 5-indanyl. | 1-(2-methyl-1,2,3,4-tetrahydro-naphthyl). |
| 5-methyl-4-indanyl. | 1-(1,5,8-trimethyl-1,2,3,4-tetrahydronaphthyl). |
| 6-methyl-5-indanyl. | 2-(6-methyl-1,2,3,4-tetrahydro-naphthyl). |
| 6-t-butyl-5-indanyl. | |
| 5-chloro-4-indanyl. | 2-[1,2,3,4-tetrahydronaphthyl]. |
| 6-chloro-5-indanyl. | 1-indanyl. |
| 1-naphthyl. | 2-indanyl. |
| 2-naphthyl. | 1-methyl-1-indanyl. |
| 1-(5,6,7,8-tetrahydronaphthyl). | 2-methyl-2-indanyl. |
| 2-(5,6,7,8-tetrahydronaphthyl). | 1-ethyl-1-indanyl. |
| 3-(2-methyl-4-pyronyl). | 2-bicyclo-[4·4·0]-decyl. |
| 4-quinolyl. | Thujyl. |
| 8-quinolyl. | Fenchyl. |
| 5-(1,4-naphthoquinonyl). | 2-pyridylmethyl. |
| 4-(coumarinyl). | 4-pyridylmethyl. |
| 3-thianaphthenyl. | 4-imidazolylmethyl. |
| 2-phenazinyl. | Phthalimidomethyl. |
| 2-(anthraquinonyl). | 2-(N-methylanilino)ethyl. |
| 4-(6-methylquinolyl). | 2-dimethylaminoethyl. |
| 2-fluorenyl. | 2-dibutylaminoethyl. |
| 6-(1,2-naphthoquinonyl). | 2-(2-imidazolino)ethyl. |
| 1-anthraquinonyl. | 2-piperidinoethyl. |
| 7-isoquinolyl. | 3-morpholinopropyl. |
| 5-(1,3-benzodioxolyl). | 3-thiomorpholinopropyl. |
| 3-(4-pyronyl). | 2-pyrrolidinoethyl. |
| 1-(3-methyl-5,6,7,8-tetrahydro-naphthyl). | 2-pyrroloethyl. |
| | 2-(N-methyl)piperazinoethyl. |
| 2-(4-methyl-5,6,7,8-tetrahydro-naphthyl). | 2-(1,4,5,6-tetrahydropyrimidio)-ethyl. |
| 2-(1,6-dimethyl-5,6,7,8-tetrahydro-naphthyl). | 3-imidazolopropyl. |
| | 2-diethylamino-1-propyl. |
| 1-(3,4,6-trimethyl-5,6,7,8-tetra-hydronaphthyl). | 3-pyrrolidino-2-propyl. |
| | 3-piperidino-2-propyl. |
| 2-acetyl-5-dimethylaminophenyl. | 3-diethylamino-2-propyl. |
| 2-furyl. | 3-morpholino-2-propyl. |
| 3-furyl. | 3-dimethylamino-2-propyl. |
| 2-(1,4-naphthoquinonyl). | 2-morpholinopropyl. |
| Cyclopropyl. | 3-diisopropylaminopropyl. |
| Cyclohexyl. | o-Chlorobenzyl. |
| 1-methyl-1-cyclopentyl. | p-Bromobenzyl. |
| 3-piperidinopropyl. | m-Methylbenzyl. |
| 3-(N-methylanilino)propyl. | p-Ethylbenzyl. |
| 3-(methylethylamino)-2-propyl. | o-Nitrobenzyl. |
| 3-pyrrolo-2-propyl. | m-Nitrobenzyl. |
| 3-(2-imidazolino)-2-propyl. | o-Methoxybenzyl. |
| 3-imidazolo-2-propyl. | p-Ethoxybenzyl. |
| 2-dimethylamino-1-propyl. | p-Butyrylbenzy. |
| 2-(2,5-dimethylpyrrolidino)-1-propyl. | o-Fluorobenzyl. |
| | o-Dimethylaminobenzyl. |
| Morpholinoethyl. | Benzohydryl. |
| Piperidinomethyl. | Trityl. |
| N-ethylpiperazinomethyl. | Cholesteryl. |
| 2-(N-methylanilino)-1-propyl. | 2-furylmethyl. |
| Crotyl. | 3-pyridylmethyl. |
| 3-hexen-2-yl. | [2,2-diethyl-1,3-dioxolon-4-yl]-methyl. |
| 2-methyl-3-penten-2-yl. | |
| 1-octen-3-yl. | 2-piperidino-1-propyl. |
| Benzyl. | 2-imidazolino-1-propyl. |
| 3-di-(n-propylamino)-2-propyl. | 3-N-ethylpiperazino-2-propyl. |
| 3-di-(n-butylamino)-2-propyl. | |
| 2-di-(n-butylamino)-1-propyl. | |

EXAMPLE VIII

Other aryl malonic acid mono-esters, wherein $R_1$ is 3-furyl, 3-pyridyl, 4-pyridyl, p-tolyl, o-methoxyphenyl, p-methoxyphenyl, p-trifluoromethylphenyl, p-chlorophenyl, o-dimethylaminophenyl, and p-dimethylaminophenyl, are prepared by the method of Example I(A).

| R₂ | R₂ |
|---|---|
| Methyl. | m-Ethylphenyl. |
| Decyl. | o-Isopropylphenyl. |
| Tetradecyl. | p-t-Butylphenyl. |
| 2-chloroethyl. | o-Methoxyphenyl. |
| 3-chloropropyl. | p-Methoxyphenyl. |
| 1-methyl-3-chloropropyl. | m-Ethoxyphenyl. |
| 3-bromopropyl. | p-n-Butoxyphenyl. |
| 1,3-dichloropropyl. | o-Chlorophenyl. |
| 2,3-dibromopropyl. | p-Chlorophenyl. |
| 2,2-dichloroethyl. | m-Bromophenyl. |
| 2,2,3,3-tetrabromopropyl. | p-Fluorophenyl. |
| 2,2,2-trichloroethyl. | o-Formylphenyl. |
| 2,2,2-trifluoroethyl. | m-Formylphenyl. |
| 2-nitroethyl. | p-Butyryphenyl. |
| 3-nitropropyl. | o-Nitrophenyl. |
| 3-nitrobutyl. | m-Nitrophenyl. |
| 2,2-dinitroethyl. | o-Dimethylaminophenyl. |
| 2-bromo-2-nitroethyl. | o-Di-n-butylaminophenyl. |
| 2-chloro-2-nitrobutyl. | m-Di-n-propylaminophenyl. |
| 1-trichloromethyl-2-nitroethyl. | p-Methylethylaminophenyl. |
| 1-trifluoromethylethyl. | p-Methylisopropylaminophenyl. |
| 2-methoxyethyl. | 2,3-dimethylphenyl. |

TABLE—Continued

| R₂ | R₂ |
|---|---|
| 2-n-butoxyethyl. | 2,5-dimethylphenyl. |
| 4-ethoxy-n-butyl. | 2,3-diethylphenyl. |
| 2-cyanoethyl. | Pentamethylphenyl. |
| 3-cyanopropyl. | 2,6-dichlorophenyl. |
| 1-cyano-2,2-dichloropropyl. | 2,6-dibromophenyl. |
| 1-cyano-2,2,2-trichloroethyl. | 2,4,6-trichlorophenyl. |
| 2-acetoxyethyl. | Pentachlorophenyl. |
| 3-butyryloxypropyl. | 2,4-dinitrophenyl. |
| Acetonyl. | Pentafluorophenyl. |
| 4-oxohexyl. | 4-bromo-3-methoxyphenyl. |
| 1-ethoxy-2,2,2-trichloroethyl. | 2-chloro-6-methoxyphenyl. |
| 1-methoxy-2,2,2-trifluoroethyl. | 3-methoxy-2-methylphenyl. |
| 1-butoxy-2,2,2-trifluoroethyl. | 2-methoxy-6-propylphenyl. |
| 2-oxo-3-chloropropyl. | 5-fluoro-2-methoxyphenyl. |
| 1-trichloromethyl-3-oxobutyl. | 4-acetyl-2-fluorophenyl. |
| 2-fluoroethyl. | 4-chloro-2-methylphenyl. |
| 1-nitro-1-trifluoromethyl-2,2,2-trifluoroethyl. | 4-chloro-2-nitrophenyl. |
| | 4-acetyl-2-fluoro-5-nitrophenyl. |
| 1-t-butoxy-2,2,2-trichloroethyl. | 5-(1,3-benzodioxolyl). |
| Phenyl. | 2-acetyl-4-chlorophenyl. |
| o-Tolyl. | 4-dimethylamino-2-methylphenyl. |
| p-Tolyl. | 2,3-dimethoxyphenyl. |
| 3,5-dimethoxy-2-methylphenyl. | 3-diethylaminopropyl. |
| 3,4,5-trimethoxyphenyl. | 2-piperidinoethyl. |
| m-Acetylphenyl. | 3-morpholinopropyl. |
| o-Propionylphenyl. | 2-pyrrolidinoethyl. |
| 4-indanyl. | 2-pyrroloethyl. |
| 5-indanyl. | 2-di-(n-propyl)aminoethyl. |
| 5-methyl-4-indanyl. | 3-morpholinopropyl. |
| 7-methyl-5-indanyl. | Pyrrolidinomethyl. |
| 1,1-dimethyl-4-indanyl. | Morpholinomethyl. |
| 6-chloro-5-indanyl. | 3-diisopropylamino-2-propyl. |
| 4-(α,α-dimethylbenzyl)phenyl. | 2-dimethylamino-1-propyl. |
| 1-naphthyl. | 2-dimethylaminoethyl. |
| 2-naphthyl. | 2-(N-methylanilino)ethyl. |
| 1-(5,6,7,8-tetrahydronaphthyl). | 3-(N-methylanilino)-2-propyl. |
| 2-(5,6,7,8-tetrahydronaphthyl). | 2-(N-methylanilino)-1-propyl. |
| 3-(2-methyl-4-pyronyl). | 3-(2-imidazolino)-2-propyl. |
| 3-quinolyl. | 3-(4-methylpiperidino)2-propyl. |
| 8-quinolyl. | 2-pyrrolo-1-propyl. |
| 5-(1,4-naphthoquinonyl). | 2-morpholino-1-propyl. |
| 4-(coumarinyl). | 2-imidazolo-1-propyl. |
| 5-(coumarinyl). | 2-(1,4,5,6-tetrahydropyrimidino)-1-propyl. |
| 3-thianaphthenyl. | |
| 2-phenazinyl. | 2-dipropylamino-1-propyl. |
| 2-(anthraquinonyl). | 2-piperidinoethyl. |
| 1-fluorenyl. | 3-piperidinopropyl. |
| 2-fluorenyl. | 2-pyrrolidinoethyl. |
| 7-(1,2-naphthoquinonyl). | 2-(1,4,5,6-tetrahydropyrimidino) ethyl. |
| 1-anthraquinonyl. | |
| 8-isoquinolyl. | 3-pyrrolidino-2-propyl. |
| 4-(1,3-benzodioxolyl). | 3-diethylamino-2-propyl. |
| 1-(4-methyl-5,6,7,8-tetrahydro-naphthyl). | 3-morpholino-2-propyl. |
| | 3-dimethylamino-2-propyl. |
| 2-acetyl-5-dimethylaminophenyl. | 2-azetidinoethyl. |
| 2-furyl. | 2-pyridylmethyl. |
| 3-furyl. | Phthalimidomethyl. |
| Cyclopropyl. | Benzyl. |
| Cyclohexyl. | o-Chlorobenzyl. |
| 1,2,5-trimethyl-1-cyclopentyl. | m-Chlorobenzyl. |
| 1-isopropyl-1-cyclohexyl. | p-Bromobenzyl. |
| 2-chloro-1-indanyl. | m-Methylbenzyl. |
| 3-bromo-1-indanyl. | o-Nitrobenzyl. |
| 2-methyl-6-propyl-1-cyclohexyl. | p-Ethoxybenzyl. |
| 1-(1,2,3,4-tetrahydronaphthyl). | m-Acetylbenzyl. |
| 2-(1,2,3,4-tetrahydronaphthyl). | o-Fluorobenzyl. |
| 1-indanyl. | p-Dimethylaminobenzyl. |
| 2-indanyl. | Benzohydryl. |
| 1-methyl-1-indanyl. | Trityl. |
| 2-bicyclo-[4·4·0]-decyl. | 2-furylmethyl. |
| 7-adamantanyl. | 2-pyridylmethyl. |
| 2-dimethylaminoethyl. | 2-diisopropylamino-1-propyl. |
| 3-thiomorpholino-2-propyl. | 2-imidazolidino-1-propyl. |
| 3-(1,4,5,6-tetrahydropyrimidino)-2-propyl. | |

EXAMPLE IX

Again following the procedure of Example I, the following aryl malonic acid mono-esters, wherein the aryl group, $R_1$, for each of the ester values given, is m-tolyl, m-methoxyphenyl, m-trifluoromethylphenyl, o-isopropylphenyl, o-chlorophenyl, o-bromophenyl, m-bromophenyl, m - chlorophenyl, o-butoxyphenyl, o-butylphenyl, o-diethylaminophenyl, p-di-(n-propyl)-aminophenyl, o - dibutylaminophenyl, and m - dimethylaminophenyl, are prepared.

$$R_1-CH \begin{matrix} COOH \\ COOR_2 \end{matrix}$$

| R₁ | R₂ |
|---|---|
| Methyl. | o-Tolyl. |
| i-Propyl. | m-n-Propylphenyl. |
| n-Butyl. | o-Isopropylphenyl. |
| Octyl. | p-t-Butylphenyl. |
| Octadecyl. | m-Methoxyphenyl. |
| 2-chloroethyl. | o-Ethoxyphenyl. |
| 3-chloropropyl. | p-n-Butoxyphenyl. |
| 1-methyl-2-bromoethyl. | m-Chlorophenyl. |

TABLE—Continued

| R₂ | R₂ |
|---|---|
| 2,2-dichloroethyl. | o-Bromophenyl. |
| 2,3,3-tribromopropyl. | p-Fluorophenyl. |
| 2,2,2-trichloroethyl. | m-Formylphenyl. |
| 2,2,2-trifluoroethyl. | o-Acetylphenyl. |
| 2-nitroethyl. | m-Nitrophenyl. |
| 3-nitrobutyl. | p-Nitrophenyl. |
| 2,2-dinitroethyl. | o-Dimethylaminophenyl. |
| 1-trichloromethyl-2-nitroethyl. | m-Di-n-propylaminophenyl. |
| 2-methoxyethyl. | p-Methylisopropylaminophenyl. |
| 2-isopropoxyethyl. | 3,4-dimethylphenyl. |
| 3-sec-butoxypropyl. | 2,4-diethylphenyl. |
| 2-cyanoethyl. | 2-methyl-6-n-propylphenyl. |
| 3-cyanopropyl. | 3,4,5-trimethylphenyl. |
| 1-cyano-2,2,2-trichloroethyl. | 2,6-dichlorophenyl. |
| 2-acetoxyethyl. | 2,4,6-tribromophenyl. |
| 2-butyryloxyethyl. | Pentachlorophenyl. |
| Acetonyl. | 3,5-dinitrophenyl. |
| 4-oxopentyl. | 2-methoxy-4-methylphenyl. |
| 2-methyl-3-oxobutyl. | 5-bromo-2-methoxyphenyl. |
| 1-methoxy-2,2,2-trichloroethyl. | 2-chloro-6-methoxyphenyl. |
| 1-ethoxy-2,2,2-trifluoroethyl. | 2-acetyl-4-fluorophenyl. |
| Phenyl. | 4-chloro-2-methylphenyl. |
| 4-fluoro-3-methylphenyl. | 2-morpholinoethyl. |
| 3-fluoro-4-nitrophenyl. | 3-thiomorpholinopropyl. |
| 2-acetyl-6-dimethylaminophenyl. | 2-pyrrolidinoethyl. |
| 4-dimethylamino-2-methylphenyl. | 3-pyrrolepropyl. |
| 2,6-dimethoxyphenyl. | 2-(1,4,5,6-tetrahydropyrimidino)-ethyl. |
| 3,5-dimethoxyl-4-methylphenyl. | 3-di-(n-propylamino)-2-propyl. |
| 3,4,5-trimethoxyphenyl. | 2-dimethylaminoethyl. |
| o-Propionylphenyl. | 2-imidazoloethyl. |
| 4-indanyl. | 2-azetidinoethyl. |
| 5-indanyl. | 3-dimethylaminopropyl. |
| 1-methyl-5-indanyl. | 3-morpholinopropyl. |
| 4-(α,α-dimethylbenzyl)phenyl. | 3-(N-methylpiperazino)propyl. |
| 1-naphthyl. | 3-(2-imidazolino)propyl. |
| 2-naphthyl. | Piperidinomethyl. |
| 1-(5,6,7,8-tetrahydronaphthyl). | 2-pyrrolidino-1-propyl. |
| 2-(5,6,7,8-tetrahydronaphthyl). | 2-morpholino-1-propyl. |
| 3-(2-methyl-4-pyronyl). | 2-pyrrolo-1-propyl. |
| 4-quinolyl. | 2-imidazolo-1-propyl. |
| 5-(1,4-naphthoquinonyl). | 3-(2-imidazolino)-2-propyl. |
| 6-(coumarinyl). | 2-(methylethylamino)ethyl. |
| 2-phenazinyl. | 2-diethylamino-1-propyl. |
| 2-(anthraquinonyl). | 3-pyrrolidino-2-propyl. |
| 2-fluorenyl. | 3-piperidino-2-propyl. |
| 6-(1,2-naphthoquinonyl). | 3-diethylamino-2-propyl. |
| 1-anthraquinonyl. | 3-morpholino-2-propyl. |
| 7-isoquinolyl. | 2-(N-methylanilino-)-1-propyl. |
| 5-(1,3-benzodioxolyl). | 3-pyridylmethyl. |
| 5-acetyl-5-dimethylaminophenyl. | 4-imidazolylmethyl. |
| 2-acetyl-5-ethoxyphenyl. | Phthalimidomethyl. |
| Cyclobutyl. | Allyl. |
| Cyclohexyl. | 5-hexen-2-yl. |
| 1-methyl-1-cyclopentyl. | Propargyl. |
| 1-methyl-1-cyclohexyl. | 3-octyn-1-yl. |
| 1-chloro-2-indanyl. | Benzyl. |
| 2-bromo-1-indanyl. | p-Chlorobenzyl. |
| 1-indanyl. | o-Bromobenzyl. |
| 2-indanyl. | p-Methylbenzyl. |
| 2-methyl-1-indanyl. | m-Nitrobenzyl. |
| 1-methyl-1-indanyl. | m-Methoxybenzyl. |
| 2-bicyclo-[4.4.0]-decyl. | p-Acetylbenzyl. |
| 1-(1-methyl-1,2,3,4-tetrahydronaphthyl). | p-Fluorobenzyl. |
| | o-Dimethylaminobenzyl. |
| 2-(3-chloro-1,2,3,4-tetrahydronaphthyl). | Benzohydryl. |
| 2-piperidipoethyl. | Cholesteryl. |
| 2-(1,4,5,6-tetrahydropyrimidino)-1-propyl. | 2-furylmethyl. |
| | 2-thiomorpholino-1-propyl. |
| 2-(N-n-butylpiperazino)-1-propyl. | 3-diisopropylamino-2-propyl. |

EXAMPLE X

Mono-4-Isopropylphenyl Phenylmalonate

A mixture of phenylmalonic acid (0.05 mole), 4-isopropylphenol (0.045 mole), di-isopropylether (90 ml.), N,N-dimethylformamide (0.08 ml.), and thionyl chloride (0.05 mole) is reacted according to the procedure of Example I. From the crude, oily product (9.9 g.), 9.3 g. of crystalline product is obtained; 69.5% yield. M.P.=104°–107° C.

Substitution of thionyl bromide for thionyl chloride produces substantially the same yield.

PREPARATION A

Malonic Acids

The following aryl malonic acids not previously described in the literature are prepared by the method of Wallingford et al., J. Am. Chem. Soc., 63, 2056–2059 (1964) which comprises condensing an alkyl carbonate, usually diethyl carbonate, with an equimolar proportion of the desired ethyl aryl acetate in the presence of an excess (4–8 times) of sodium ethylate with continuous removal of by-product alcohol from the reaction mixture. The esters thus produced are hydrolyzed to the acid by known methods.

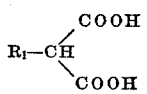

| R¹ | R¹ |
|---|---|
| 3-furyl. | 3-pyridyl. |
| o-Methoxyphenyl. | 4-pyridyl. |
| m-Methoxyphenyl. | o-Butoxyphenyl. |
| p-Methoxyphenyl. | o-Dimethylaminophenyl. |
| o-Trifluoromethylphenyl.[1] | o-Diethylaminophenyl. |
| m-Trifluoromethylphenyl. | m-Dimethylaminophenyl. |
| p-Trifluoromethylphenyl. | p-Dimethylaminophenyl. |
| o-Isopropylphenyl. | o-Dibutylaminophenyl. |
| p-Di-(n-propyl)aminophenyl. | |

[1] The necessary o-trifluoromethylphenylacetic acid is prepared from o-trifluoromethylbenzonitrile by the procedure of Corse, et al., J. Am. Chem. Soc. 70, 2841 (1948) which comprises: (a) conversion of the nitrile to o-trifluoromethylacetophenone by a Grignard reaction with methylmagnesium iodide followed by hydrolysis; (b) reaction of the acetophenone with sulfur and morpholine at 135° C. for 16 hours followed by treatment with glacial acetic acid and hydrochloric acid.

What is claimed is:

1. In a process for the mono-esterification of phenyl malonic acid by reacting phenyl malonic acid with 2-isopropyl phenol in the presence of a thionyl halide selected from the group consisting of thionyl chloride and thionyl bromide and a catalytic amount of an N,N-di(lower)alkyl alkanoic acid amide selected from the group consisting of N,N-di(lower)alkyl-formamide and N,N-di(lower)alkyl-acetamide, the improvement which comprises conducting the reaction in the presence of di-isopropyl ether solvent.

References Cited

UNITED STATES PATENTS 3,282,926   1/1966   Brain et al. _____ 260—475 SC

FOREIGN PATENTS 1,475,623   4/1967   France _____ 260—475PN

OTHER REFERENCES

Kittila: Dimethyl Formamide, pp. 68 and 69 (1967).

LORRAINE A. WEINBERGER, Primary Examiner

F. J. SKELLY, Assistant Examiner

U.S. Cl. X.R.

260—239 A, 243 B, 247.1, 247.2 B, 251 R, 256.4 R, 267, 268 R, 268 FT, 268 H, 287 R, 293.67, 293.68, 293.69, 293.79, 293.81, 293.82, 294.8 D, 294.9, 295 R, 306.7, 309, 309.6, 326 A, 326 N, 326 S, 326.35, 326.36, 326.43, 330.5, 332.2 A, 340.3, 340.9, 345.2, 345.8, 347.4, 376, 396 R, 397.2, 465 D, 471 R, 472, 473 R

UNITED STATES PATENT OFFICE
CERTIFICATE OF CORRECTION

Patent No. 3,824,275              Dated July 16, 1974

Inventor(s) Robert V. Kasubick

It is certified that error appears in the above-identified patent and that said Letters Patent are hereby corrected as shown below:

Column 2, line 14, change "moon" to --mono--.
Column 3, lines 22, 23, between "The" and "of" insert --use--.
Column 3, line 51, after "functional groups" insert --other--.
Column 5, Example V, line 7 of the table under the headings,
    in columns 1 and 2 insert --0.05--.
Column 5, Example V, line 5 of the table under the headings,
    in column 7 change "1,5" to --1.5--.
Column 5, Example V, lines 1-9 of the table under the headings,
    in columns 2 and 3 change the commas to decimal points.

Signed and sealed this 1st day of April 1975.

(SEAL)
Attest:

RUTH C. MASON
Attesting Officer

C. MARSHALL DANN
Commissioner of Patents
and Trademarks